United States Patent [19]

Dinitz et al.

[11] Patent Number: 5,474,408
[45] Date of Patent: Dec. 12, 1995

[54] BREAK-AWAY COUPLING WITH SPACED WEAKENED SECTIONS

[75] Inventors: Arthur M. Dinitz, Westpoint; Tauhid Husain, Storrs, both of Conn.

[73] Assignee: Transpo Industries, Inc., New Rochelle, N.Y.

[21] Appl. No.: 145,644

[22] Filed: Nov. 4, 1993

[51] Int. Cl.$^6$ .............. F16B 31/00; F16B 35/00; F16D 9/00
[52] U.S. Cl. .............. 411/5; 411/389; 256/13.1; 403/2
[58] Field of Search .............. 411/3, 4, 5, 389, 411/388; 256/13.1; 403/2

[56] References Cited

U.S. PATENT DOCUMENTS

| | | | |
|---|---|---|---|
| 1,926,925 | 9/1933 | Wescott | 411/389 X |
| 3,521,413 | 7/1970 | Scott et al. | 411/389 X |
| 3,837,752 | 9/1974 | Shewchuk | 403/2 |
| 3,951,556 | 4/1976 | Strizki | 403/2 |
| 3,967,906 | 7/1976 | Strizki | 256/13.1 X |
| 4,528,786 | 7/1985 | Dinitz et al. | 403/2 X |
| 4,923,319 | 5/1990 | Dent | 403/2 |

*Primary Examiner*—Neill R. Wilson
*Attorney, Agent, or Firm*—Lackenbach Siegel Marzullo Aronson & Greenspan

[57] ABSTRACT

A break-way coupling with spaced weakened sections includes a central controlled breaking region and rigid threaded bolts at each end for connection to a base at one end and to a pole or the like at the other end. The controlled breaking region includes two axially spaced necked-down portions of smaller diameter and solid cross-section. Where the axil length of the controlled breaking region is L and the necked-down portions have a diameter D, the dimensions D and L are selected so that the ratio D/L is within the range $D/L \leq 0.3$. The necked-down portions have conical tapered surfaces to insure that at least one of the necked-down portions break upon bending prior to contact between any surfaces forming or defining the necked-down portions.

13 Claims, 1 Drawing Sheet

BREAK-AWAY COUPLING WITH SPACED WEAKENED SECTIONS

BACKGROUND OF THE INVENTION

The present invention generally relates to lighting poles and other appurtenances mounted along highways and roadways, and particularly, to break-away couplings for supporting such lighting poles and other appurtenances which are frangible and facilitate the disengagement of the lighting pole or the like from the base on which it is mounted to minimize bodily and property damage when an automobile collides with the lighting pole.

Many highway and roadside appurtenances, such as lighting poles, signs, etc., are mounted along highways and roads. Typically, these are mounted on and supported by concrete foundations, bases or footings. However, while it is important to securely mount such roadside appurtenances to withstand weight, wind, snow and other types of service loads, they do create a hazard for vehicular traffic. When a vehicle collides with such a light pole or signpost, for example, a substantial amount of energy is normally be absorbed by the light pole or post or impacting vehicle unless it is mounted to be severed from the base. Unless the post is deflected or severed from the base, therefore, the vehicle may be brought to a sudden stop with potentially fatal or substantial injury to the passengers. For this reason, highway authorities almost universally specify that light poles and the like must be mounted in such a way that they can be severed from the support structure upon impact by a vehicle and passengers.

In designs of such break-away couplings several facts or considerations come into play. The couplings must have maximum tensil and compressive strength with predetermined (controlled) resistance to bending. Additionally, the couplings must be easy to install and maintain. They must, of course, be totally reliable.

Numerous break-away systems have been proposed for reducing damage to a vehicle and its occupants upon impact. For example, a load concentrated break-away couplings are disclosed in U.S. Pat. Nos. 3,637,244, 3,951,556 and 3,967,906 in which load concentrating elements eccentric to the axis of the fasteners, for attaching the couplings to the system, oppose the bending of the couplings under normal loads while presenting less resistance to bending of the coupling under impact or other forces applied near the base of the post. In U.S. Pat. Nos. 3,570,376 and 3,606,222, structures are disclosed which include a series of frangible areas. In both cases, the frangible areas are provided about substantially cylindrical structures. Accordingly, while the supports may break along the frangible lines, they do not minimize forces for bending of the posts and, therefore, generally require higher bending energies, to the possible detriment of the motor vehicle.

In U.S. Pat. No. 3,755,977 a frangible lighting pole is disclosed which is in a form of a frangible coupler provided with a pair of annular shoulders that are axially spaced from each other. In a sense, the annular shoulders are in the form of internal grooves. A tubular section is provided which is designed to break in response to a lateral impact force of an automobile. The circumferential grooves are provided along a surface of a cylindrical member.

A coupling for a break-away pole is described in U.S. Pat. No. 3,837,752 which seeks to reduce maximum resistance of a coupler to bending fracture by introducing circumferential grooves on the exterior surface of the coupler. The distance from the groove to the coupler extremity is described as being approximately equal to or slightly less than the inserted length of a bolt or a stud that is introduced into the coupler to secure the coupler, at the upper ends, to a base plate that supports the post and to the foundation base or footing on which the post is mounted. The grooves are provided to serve as stress concentrators for inducing bending fracture and to permit maximum effective length of moment arm and, therefore, maximum bending moment. The intention design is intended to have the grooves provide better control on the bending strength applied by a vehicle before severance or fracture takes place. The grooves in this patent are generally shallow and of a rectangular cross-section. Because the coupler is provided with a central axial bore for the introduction of a bolt, the coupler is cylindrical in form and is not a solid member. Because the coupler described in the patent has a cylindrical bore in the middle, very little of the metal is situated on the neutral axis (along the central axis) about which bending takes place, so that, for a given cross-section of material required to withstand a predetermined amount of tensil and compressive stress, the coupler disclosed in the patent is more resistant to bending than a comparable solid member. Because the patent requires that the bolts or studs penetrate at least as deep as the end of the notch or groove, the design is not practical since such design requires that the bolts or studs to bend simultaneously with the coupler about the notch or groove, at least to some degree, during impact. However, it is a major drawback to have the bolts or studs have any effect on the breaking strength of the part since control over the breaking characteristics of the coupler are lost and the point at which the coupler breaks is a function of a system consisting of the coupling as well as the bolt or stud. This patent also requires that the geometry of the shape of the base (the inner or bottom surface) of the groove is to be used to produce the required weakness in bending. According to the patent, the diameter of the neck is not the variable to manipulate in order to achieve the desired breaking strength of the part, as the axial (tensil/compressive) strength is also affected.

SUMMARY OF THE INVENTION

It is, accordingly, an object of the present invention to provide a break-away coupling for a highway or roadway appurtenance which does not have the disadvantages inherent in comparable prior art break-away couplings.

It is another object of the present invention to provide a break-away coupling which is simple in construction and economical to manufacture.

It is still another object of the present invention to provide a break-away coupling of the type under discussion which is simple to install and requires a minimal effort and time to install in the field.

It is yet another object of the present invention to provide a break-away coupling as in the aforementioned objects which is simple in construction and reliable, and whose functionality is highly predictable.

It is a further object of the present invention to provide a break-away coupling as in the previous objects which can be retrofitted to most existing break-away coupling systems.

It is still a further object of the present invention to provide a break-away coupling which minimizes forces required to fracture the coupling in bending while maintaining safe levels of tensil and compressive strength to withstand non-impact forces, such as wind load.

It is yet a further object of the present invention to provide break-away couplings of the type suggested in the previous objects which essentially consists of one part and, therefore, requires minimal assembly in the field and handling of parts.

In order to achieve the above objects, as well as others which will become apparent hereafter, a multiple weakened sections (necked-down) break-away coupling for highway and roadside appurtenances to be mounted on a base defines an axis and comprises a controlled breaking region arranged along said axis. The controlled breaking region has opposing axial ends. First connecting means is provided for connecting one of said opposing axial ends to the highway or roadside appurtenance, while a second connecting means is provided for connecting another of the opposing axial ends to a base on which the highway or roadside appurtenance is to be mounted. Said controlled breaking region includes at least two axial spaced necked-down portions coaxially arranged along said axis and having solid cross-sections with radial dimensions generally smaller than any other radial dimensions of the coupling. In this manner, bending of the coupling takes place about a neutral plane extending through said necked-down portions and breaking is achieved with minimum lateral or traverse forces applied to the highway or roadside appurtenance. According to a feature of the invention, each necked-down portion is defined by a plurality of annular surfaces dimensioned and arranged to insure that at least one of said necked-down portions breaks upon bending prior to contact between any two annular surfaces forming said necked-down portions. In order to derive the maximum benefits from the present invention, the diameter of the necked-down portion D and the axial length of the controlled breaking portion L are selected to define a ratio within the range:

$$\frac{D}{L} \leq 0.3$$

BRIEF DESCRIPTION OF THE DRAWINGS

The invention will be thoroughly understood from the following description of a preferred embodiment thereof as read in conjunction with the accompanying drawings, in which.

DESCRIPTION OF THE PREFERRED EMBODIMENT

Figure 1:
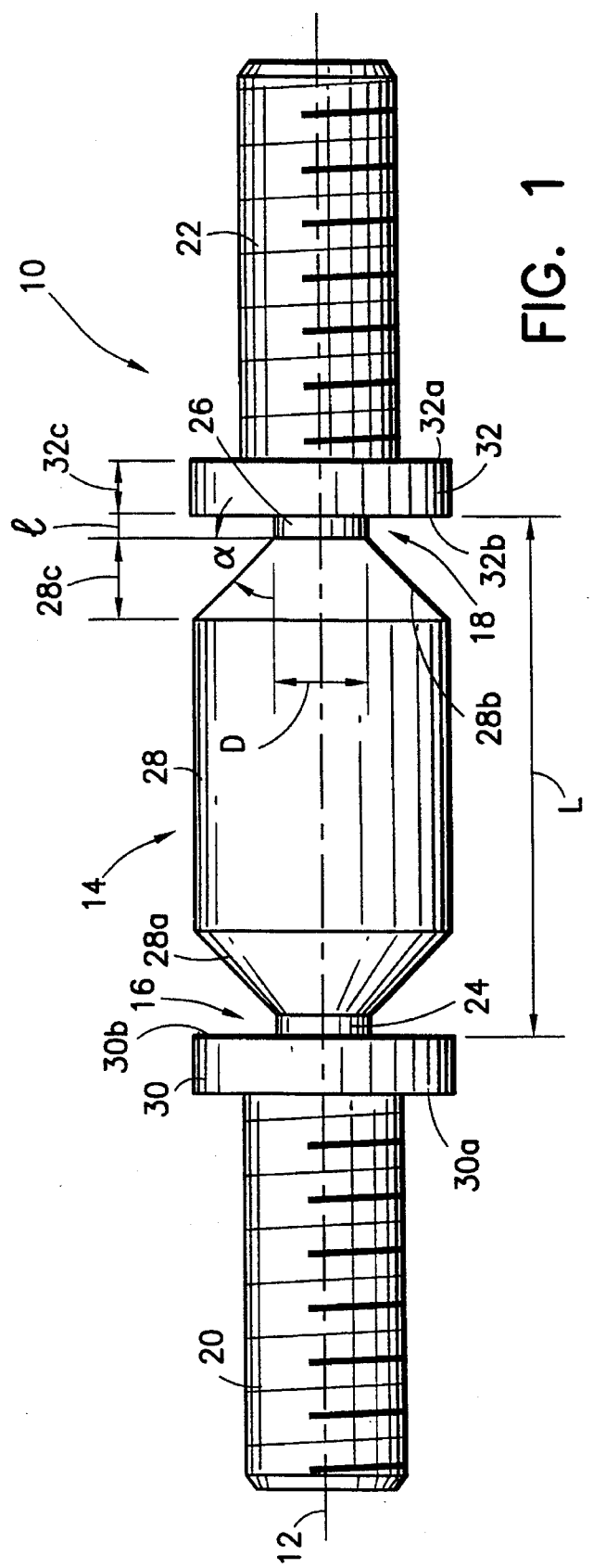
FIG. 1 is a side elevational view of a multi-necked-down break-away coupling in accordance with the present invention.
Figure 2:
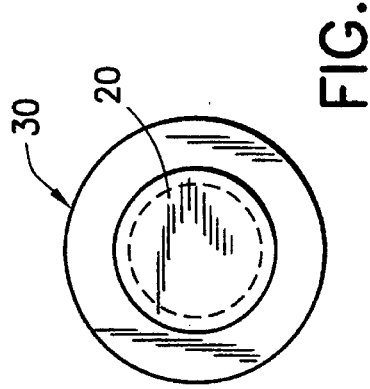
FIG. 2 is an end elevational view of the coupling shown on FIG. 1.

Referring now specifically to the Figures, in which identical or similar parts are designated by the same reference numerals throughout, a multiple necked-down break-away coupling in accordance with the present invention is generally designated by the reference numeral 10.

The coupling 10 is intended to be used for mounting a highway or roadside appurtenance on a base (not shown), as suggested in the patents set forth in the Background of the Invention. The coupling 10 generally extends along and defines an axis 12 and includes a controlled breaking region 14 essentially centrally disposed within the coupling as shown on FIG. 1, and having opposing axial ends 16, 18. A first connecting means 20, in the form of an externally threaded bolt or stud, is provided for connecting one of the opposing axial ends 16 to a highway or roadway appurtenance (not shown). An internally threaded member can also be used. Similarly, a second connecting means 22 is provided for connecting the other of the opposing axial ends 18 to a base on which the highway or roadside appurtenance is to be mounted (not shown).

An important feature of the present invention is the provision of at least two axially spaced necked-down portions 24, 26 within the controlled breaking region 14 which have solid cross-sections with radial dimensions generally smaller than any other radial dimensions in the coupling. Extending between the spaced and necked-down portions 24, 26 is an enlarged portion 28 that serves as a pivoting arm about which bending of the necked-down portions 24, 26 can take place.

Disc-like shoulders, stops, washer or other abutment elements 30, 32 are provided between the opposing axial ends 16, 18 of the controlled breaking region 14 and the bolts 20, 22. The shoulders 30, 32 have radial dimensions greater than those of the bolts 20, 22 to thereby serve as stops that prevent any mating members threadably mounted on the bolts from overlapping the necked-down portions and to prevent any possible interference between the connecting members and the bending characteristics of the necked-down portions 24, 26.

According to one feature of the invention, each necked-down portion is defined by a plurality of annular surfaces dimensioned and arranged to insure that at least one of the necked-down portions breaks upon bending prior to contact between any two annular surfaces forming each necked-down portion. In FIG. 1, the plurality of surfaces forming the necked-down portion 16 include by the inwardly facing surface 30b of the shoulder 30, the surface at 24 of the necked-down portion, and a truncated conical surface 28a which has minimal radial dimensions at the necked-down portion 24 and tapers outwardly in the direction of the other necked-down portion 26. Where two necked-down portions are provided, as shown in FIG. 1, the disk-like shoulders 30, 32 are provided between each necked-down portion and an associated axial end of the controlled breaking region and an associated bolt at one axial end of the necked-down portion. The truncated conical surfaces at 28a, 28b taper in a direction away from an associated disk-like shoulder. In this manner, the axial distance between the disk-like shoulder and associated truncated conical surfaces continually increases from each necked-down portion radially outwardly.

As is evident from FIG. 1, the necked-down portions 24, 26 represent the regions of smallest diameter in the entire coupling, smaller than the bolts 20, 22, the pivoting arm 28, and the disk-like shoulders 30, 32. With such a construction, and with the necked-down portions 24, 26 being solid, bending of the coupling takes place about a neutral plane extending through the necked down portions and breaking is achieved with a predetermined lateral transverse forces applied to the highway or roadside appurtenance.

In order to enhance the operation of the coupling, wherein the diameter of the necked-down portions 24, 26 is D and the axial length of the controlled breaking region 14 is L, D and L are selected so that the ratio D/L is less than or equal to 0.3.

The subject break-away coupling eliminates bolt fixity, with the dimensions of the necked-down portions 24, 26 providing a predictable control over the breaking stresses required to sever the coupling upon impact. The bolts or studs 20, 22 do not form part of the bending system and do not contribute in any way towards the bending stresses exhibited by the necked-down portions. The bolts and studs are much stronger than the necked section, hence, the necked section reaches its stress limit way before the bolts and studs. The bolts 20, 22, unlike in the coupling disclosed in U.S. Pat. No. 3,837,752, do not penetrate into or extend beyond the necked-down portions 24, 26 so that the bending and breaking parameters of the coupling are determined entirely by the geometries of the necked-down portions.

Since the tensil and compression characteristics of the coupling are essentially the same as for the prior art couplings this being determined solely by the minimum cross-sectional area of the coupling, it should be evident that the couplings provide the same tensil and compression strength for controlling weight and wind loads while fracturing upon impact with smaller horizontal forces then required with the prior art devices.

While the necked-down portions, slots or grooves 24, 26 can be any size or shape consistent with the overall design, the present invention contemplates that the surfaces be selected, as described above, in such a manner that the surfaces forming the slots or grooves never make contact prior to fracture. In this way, the lateral forces required to fracture the couplings is minimized.

The present design provides a coupling that breaks fast. While more than two notches, grooves or necked-down portions may be provided, the more such regions that are provided the slower it takes to fracture the coupling because bending is now distributed over two or more necked-down portions with each one, as a result, bending proportionately less. This, however, results in a greater amount of energy being absorbed, to the detriment of the vehicle and its passengers. As will be appreciated by those skilled in the art, an objective of the design, as well as the objective with all couplings of this type is to provide as little bending as possible before fracture. The subject design provides such early fracture without comprising the tensil and compression properties of the coupling for effecting reliable support of a sign, lamp or the like in response to wind loads, etc.

The necked-down sections 24, 26 bend relative to each other in response to transversely applied loads to produce excessive strain in the part. Rigid ends help transfer the loads directly to the weakened sections rather than to the threaded connections. The distance between the two weakened planes act as a pivoting arm. The breaking strength of the part can thus be adjusted to a large extend by varying the length of the pivoting or moment arm.

The design also allows the coupling to break very close to the fixed end thereby keeping the after impact stub projection height low.

The coupling of the present invention can be used to support light poles, sign supports, or any other structural supports which have the surface loads applied higher up from the ground and are expected to break away easily when impacted by a vehicle. The couplings have the ability to break away, upon impact, from any direction and, unlike slip-based systems, does not require any maintenance. Simplicity of the product makes installation easy and without any special training, jigs or tools.

Having described the invention, many modifications thereto will become apparent to those skilled in the art to which it pertains without deviation from the spirit of the invention as defined by the scope of the appended claims.

We claim:

1. A multiple neck break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connecting means for connecting another one of said opposing axial ends to a base on which the highway or roadside appurtenance is to be mounted, said controlled breaking region including at least two axially spaced necked-down portions coaxially arranged along said axis and having solid cross sections with radial dimensions generally smaller than any other radial dimension of the coupling, said connecting means being axially offset from said necked-down portions so that said necked-down portions can bend without interference from said connecting means, whereby bending of the coupling takes place about a neutral plane extending through said necked-down portions and breaking is achieved with minimum lateral or transverse [forms] forces applied to the highway or roadside appurtenance, bending of said necked-down portions upon impact being affected only by the property of said necked-down portions and not by any structures to which the coupling is connected.

2. A coupling as defined in claim 1, wherein said first and second connecting means each comprises an externally-threaded bolt coextensive with said axis.

3. A coupling as defined in claim 1, wherein two necked-down portions are provided each proximate to another one of said first and second connecting means to provide an enlarged portion between said necked-down portions that serves as a pivoting arm about which bending of said necked-down portions take place.

4. A coupling as defined in claim 1, wherein further comprising shoulders between said opposing axial ends of said controlled breaking region and said bolts, said shoulders having radial dimensions greater than those of said bolts to thereby serve as stops that prevent any mating members threadably mounted on said bolts to overlap said necked-down portions.

5. A coupling as defined in claim 1, wherein said controlled breaking region has circular cross-sections of varying diameters between said opposing axial ends.

6. A coupling as defined in claim 1, wherein said controlled breaking region has an axial length L and said at least two axially spaced necked-down portions have diameters D, D and L being selected so that the ratio D/L is with the range:

$$\frac{D}{L} \leq 0.3$$

7. A coupling as defined in claim 1, wherein said necked-down portions are each defined by a plurality of connected annular surfaces dimensioned and arranged to insure that at least one of said necked-down portions break upon bending prior to contact between any two annular surfaces forming each necked-down portions.

8. A coupling as defined in claim 7, wherein at least one annular surface comprises a truncated conical surface having minimum radial dimension at a location along the coupling corresponding to a minimum radial dimension of said at least one necked-down portion and tapers outwardly in the direction another one of said at least two necked-down portions.

9. A coupling as defined in claim 8, wherein two necked-down portions are provided, a disc-like shoulder being provided between each necked-down portion and an associated axial end of said controlled breaking region and an associated bolt at one axial end of said necked-down portion, and a truncated conical surface tapering in a direction away from an associated disc-like shoulder, whereby the axial distance between said disc-like shoulder and associated truncated conical surfaces continually increases from each necked-down portion radially outwardly.

10. A multiple neck break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connecting means for connecting another of said opposing axial ends to a base on which the highway or roadside appurtenance is to be mounted, said controlled breaking region including at least two axially spaced necked-down portions coaxially arranged along said axis and each being defined by a plurality of annular surfaces dimensioned and arranged to insure that at least one of said necked-down portions breaks upon bending prior to contact between any two annular surfaces forming each necked-down portion: said connecting means being axially offset from said necked-down portions so that said necked-down portions can bend without interference from said connecting means, bending of said necked-down portions upon impact being affected only by the properties of said neck-down portions and not by any structures to which the coupling is connected.

11. A multiple neck break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connected means for connecting another of said opposing axial ends to a base on which the highway or roadside appurtenance is to be mounted, said controlled breaking region having an axial length L and having at least two axially spaced necked-down portions of reduced diameter D, D and L being selected so that the ratio D/L is within the range:

$$\frac{D}{L} \leq 0.3,$$

said connecting means being axially offset from said necked-down portions so that said necked-down portions can bend without interference from said connecting means, bending of said necked-down portions upon impact being affected only by the properties of said neck-down portions and not by any structures to which the coupling is connected.

12. A multiple neck break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connecting means for connecting another one of said opposing axial ends to a base on which the highway or roadside appurtenance is to be mounted, said controlled breaking region including at least two axially spaced necked-down portions coaxially arranged along said axis and having solid cross-sections with radial dimensions generally smaller than any other radial dimension of the coupling, further comprising shoulders between said opposing axial ends of said controlled breaking region and said bolts, said shoulders having radial dimensions greater than those of said bolts to thereby serve as stops that prevent any mating members threadably mounted on said bolts to overlap said necked-down portions, whereby bending of the coupling takes place about a neutral plane extending through said necked-down portions and breaking is achieved with minimum lateral or transverse forces applied to the highway or roadside appurtenance.

13. A multiple neck break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connecting means for connecting another one of said opposing axial ends to a base on which the highway or roadside appurtenance is to be mounted, said controlled breaking region including at least two axially spaced necked-down portions coaxially arranged along said axis and having solid cross-sections with radial dimensions generally smaller than any other radial dimension of the coupling, said necked-down portions each being defined by a plurality of connected annular surfaces dimensioned and arranged to insure that at least one of said necked-down portions breaks upon bending prior to contact between any two annular surfaces forming each necked-down portion, at least one annular surface comprising a truncated conical surface having minimum radial dimension at a location along the coupling corresponding to a minimum radial dimension of said at least one necked-down portion and tapers outwardly in the direction another one of said at least two necked-down portions, whereby bending of the coupling takes place about a neutral plane extending through said necked-down portions and breaking is achieved with a minimum lateral or transverse forces applied to the highway or roadside appurtenance.

\* \* \* \* \*